Patented June 15, 1954

2,681,355

UNITED STATES PATENT OFFICE 2,681,355

METHOD OF PREPARING ORGANOSILANES

Arthur J. Barry and John W. Gilkey, Midland, Mich., assignors to Dow Corning Corporation, Midland, Mich., a corporation of Michigan No Drawing. Application February 20, 1953, Serial No. 338,123

3 Claims. (Cl. 260—448.2)

This invention relates to the manufacture of methylchlorosilanes.

The primary commercial method for preparing methylchlorosilanes such as $CH_3SiCl_3$, $CH_3HSiCl_2$, and $(CH_3)_2SiCl_2$ is that of reacting $CH_3Cl$ with silicon. This method is known in the art as the "direct process" and is well described in the patent literature, for example, in U. S. Patents 2,380,995 and 2,488,487. In addition to the above methylchlorosilanes, there is always obtained a liquid material boiling above $(CH_3)_2SiCl_2$ (i. e., above 70° C.). This liquid high boiling product is hereafter referred to as "the residue." The residue amounts to about 10 per cent of the total reaction product and is a complex mixture of compounds containing SiSi, SiCSi, and SiOSi linkages in the molecules. The residue is more fully described infra.

Methylchlorosilanes are the raw materials for a major portion of the silicone products now being manufactured. Therefore, the demand for methylchlorosilanes is high. On the other hand, there is to date, little commercial use for the residue. Consequently, large inventories of the residue have been built up by the silicone industry. This inventory poses a serious problem for it represents an expensive, relatively useless material. Furthermore, continued accumulation of the residue poses a storage problem.

It is known from U. S. Patent 2,598,435 that some components of the residue, namely those containing SiSi linkages such as

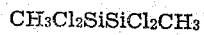
$CH_3Cl_2SiSiCl_2CH_3$ may be cracked by heat to give methylchlorosilanes. According to this patent, the SiSi compounds are separated from the residue before they are cracked. When the process of this patent is applied to the total residue, extensive coking (formation of carbonaceous materials) takes place. For example, it has been found that if the residue is passed through a hot tube (heated, say, to 200°–900° C.), sufficient coking takes place within an hour or so to render the tube unsuitable for further use. Thus, the process is not suitable for commercial cracking of the residue. The process of this invention obviates this coking.

It is the primary object of this invention to provide a commercially feasible method for converting a relatively useless material into more highly useful methylchlorosilanes. Another object is to solve the residue problem which is inherent to the production of methylchlorosilanes by the direct process.

In accordance with this invention, the residue boiling above $(CH_3)_2SiCl_2$, which residue was formed during the reaction of $CH_3Cl$ with silicon, is heated in contact with HCl at a temperature of from 200° C. to 900° C. The HCl is present in amount of at least 4 per cent by weight based on the weight of the residue. This process results in cracking of the residue to give methylchlorosilanes.

The process of the invention begins at once upon heating the mixed HCl and residue. Excellent yields of methylchlorosilanes are obtained at any pressure. It has been found that the reaction proceeds equally well at atmospheric pressure and at pressures upwards of 1500 p. s. i. In general at the lower pressures, higher temperatures are preferred. Thus, atmospheric pressure reactions are preferably carried out at from 400° C. to 900° C. while superatmospheric reactions are preferably carried out at from 200° C. to 500° C.

The process of this invention lends itself to either batchwise or continuous modes of operation. For example, the residue and HCl may be added to a bomb and heated to reaction temperatures, or the residue and HCl may be passed continuously through a heated tube. The latter method is particularly feasible since it has been found that the residue and HCl may be passed continuously through a hot tube for periods in excess of 24 hours without any reduction of the rate of reaction. In other words, the amount of desired products obtained during the 24th hour of operation is the same as during the 1st or 6th hours of operation. A further advantage of the tube procedure is that the unreacted HCl and residue may be recycled through the reactor.

In carrying out the present process at atmospheric pressure in tubes, the tubes may or may not contain packing. If packing is employed, it may be either of inert materials such as quartz or the packing may be of a catalytic type such as activated alumina or silica alumina. In both cases, satisfactory yields of the desired methylchlorosilanes are obtained. In the tube process, the residue and HCl may be fed separately into the reactor or they may be mixed prior to passage into the reactor.

There should be at least 4 per cent by weight HCl based on the weight of the residue, in order for the benefits of the invention to be realized. Larger amounts of HCl may be used, if desired, although no particular advantage is obtained by employing mixtures containing more than 50 per cent by weight HCl. Pure HCl gas or HCl gas diluted with other inert gases such as nitrogen or $CO_2$ may be used. The HCl may be recovered from the effluent material and reused if desired.

As previously pointed out, if HCl is not employed, the cracking process is characterized by so much coking that continuous operation in a heated tube is impossible. Although it has not been ascertained that the coking phenomena is solely responsible for low yields of $(CH_3)_3SiCl_2$ and $CH_3SiCl_3$, it is a fact that much lower yields of these silanes are obtained if HCl is not employed irrespective of whether the reaction is carried out in a sealed bomb at superatmospheric pressure or in a tube at atmospheric pressure.

The residue employed herein consists of a very complex mixture of a large number of silanes, disilanes, disiloxanes, silmethylene compounds, and silethylene and other polymeric compounds. Table I, which follows, lists the products identified in the residue of a representative industrial scale reaction of $CH_3Cl$ and Si. The boiling points listed are in degrees centigrade at atmospheric pressure.

TABLE I

| Compound: | B. P., ° C. |
|---|---|
| Ethyltrichlorosilane | 100 |
| Ethylmethyldichlorosilane | 102 |
| Isopropyltrichlorosilane | 118 |
| Isopropylmethyldichlorosilane | 119 |
| n-Propyltrichlorosilane | 124 |
| n-Propylmethyldichlorosilane | 125 |
| Hexachlorodisiloxane | 136 |
| $CH_3Cl_2SiOSiCl_3$ | 140 |
| Isobutyltrichlorosilane | 141.5 |
| Hexachlorodisilane | 146 |
| $(CH_3)_2ClSi\!-\!SiCl_3$ | 157 |
| $CH_3Cl_2SiOSiCl_2CH_3$ | 158 |
| $(CH_3)_2ClSiCH_2SiCl(CH_3)_2$ | 178 |
| $(CH_3)_2ClSiCH_2SiCl_3$ | 185 |
| $Cl_3SiCH_2SiCl_3$ | 185 |
| $Cl_3SiCH_2SiCl_2CH_3$ | 189 |
| $CH_3Cl_2SiCH_2SiCl_2CH_3$ | 192 |
| $C_6H_5SiCl_3$ | 201 |
| $CH_3Cl_2SiCH_2CH_2SiCl_3$ | 206 |

It can be seen that the residue is composed primarily of compounds which have methyl and/or higher alkyl radicals attached to silicon. When HCl is reacted with these compounds at the temperatures of this invention, the SiSi, SiOSi and SiCSi linkages are split to produce methylchlorosilanes having only one silicon atom per molecule. Simultaneously therewith the higher alkyl groups on the silicon are cracked by the heat to give methyl radicals. The various reactions with the HCl may be represented schematically as follows:

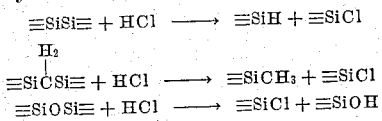

The relative proportions of the compounds listed in Table I are not known exactly, since no quantitative distillation of the residue is possible. This is due to the fact that a first distillation of the residue gives a distillate of gradually increasing boiling point. Repeated fractionations of selected portions ultimately yield pure compounds; however, the identity of material boiling between the identified compounds has not been ascertained. Due to varying reaction conditions such as temperature, feed rate, and catalysts employed in the "direct process," the composition of the residue varies somewhat with respect to ratio of organic groups per silicon. The residue generally has a hydrolyzable chlorine to Si atomic ratio ranging from 1.4:1 to 2.8:1, a monovalent hydrocarbon to Si (R/Si) ratio ranging from 1.0 to 1.5. This variation of chlorine and hydrocarbon content does not affect the operability of the residue in the present invention.

The silanes produced by the practice of this invention are all highly utilizable materials which may be employed for preparing other organosilicon materials such as resins, fluids, etc., or they may be used directly in water-repellent treatment of organic and inorganic materials.

This invention is illustrated by the following examples. However, the scope thereof is limited only as set forth in the claims.

*Example 1*

The residue employed in this example has the following approximate composition as determined by a distillation analysis.

18.3 per cent inert hydrocarbons 4.4 per cent methylchlorosilanes of the formula $Me_nSiCl_{4-n}$ 27 per cent higher alkylchlorosilanes of the formula $R_nSiCl_{4-n}$ 6.1 per cent disiloxanes of the formula $Me_nSi_2OCl_{6-n}$ 4.4 per cent hexachlorodisilane 8.8 per cent methylchlorodisilanes of the formula $Me_nSi_2Cl_{6-n}$ 26.9 per cent silcarbanes of the formulae $Me_n(SiCH_2Si)Cl_{6-n}$ $Me_nSiCH_2CH_2Si(Cl_{6-n})$ $Me_n(SiCH_2SiCH_2Si)Cl_{8-n}$ 4.1 per cent residue which comprised higher polymeric siloxanes, silanes, and silcarbanes of the above types.

In each case above, n has a value from 1 to 3.

This example illustrates vapor phase cleavage of the residue at atmospheric pressure. In each of the runs shown in Table II below, the residue and HCl were fed simultaneously and separately into a four foot stainless steel tube having an inside diameter of one inch. The tube was maintained at the temperatures indicated in the table, and the materials were passed through for the indicated time. In each run the effluent material was collected in a water cooled condenser and in a dry ice trap. The condensates were combined in each run and were fractionally distilled up to a head temperature of 75° C. In each case, the material boiling between 35° C. and 75° C. was analyzed by infra red and found to consist essentially of the silanes listed in the table. All per cents by weight shown in the table are based upon the total weight of the residue and HCl passed through the tube. In each run, the HCl was employed in amount of about 1 mol of HCl per 185 g. of the residue.

TABLE II

| Run | Tube Packing | Temp., °C. | Residue Feed Rate, cc./min. | HCl Feed Rate, cc./min. | Time of Run in Hours | Percent SiCl₄ | Percent MeHSiCl₂ | Percent Me₂SiCl₂ | Percent MeSiCl₃ |
|---|---|---|---|---|---|---|---|---|---|
| 1 | Quartz | 700 | 2.00 | 300 | 4.5 | 4.2 | 2.3 | 13.5 | 20.2 |
| 2 | ...do... | 750 | 2.12 | 300 | 6.0 | 4.5 | trace | 18.1 | 25.6 |
| 3 | Silica-alumina | 500 | 2.77 | 300 | 4.3 | 5.3 | 2.1 | 9.2 | 23.8 |
| 4 | ...do... | 600 | 2.10 | 300 | 3.5 | 5.4 | 1.8 | 8.2 | 29.5 |
| 5 | Alumina | 450 | 2.10 | 300 | 2.25 | 9.6 | trace | 5.1 | 21.2 |
| 6 | ...do... | 600 | 2.10 | 300 | 4.75 | 13.5 | trace | 9.2 | 39.5 |
| 7 | None | 700 | 4.30 | 500 | 3.25 | 8.9 | 0.8 | 10.3 | 28.8 |

In each of the above runs, the tube was examined after 5 hours, and it was found that there was negligible coking.

*Example 2*

Table III which follows shows that excellent yields of methylchlorosilanes are obtained in a batchwise process employing superatmospheric pressure. In each run shown in the table, the process was carried out as follows: A 2.4 liter steel bomb was charged with the indicated amount of the residue employed in Example 1 and HCl gas and then heated to the indicated temperature. The bomb was continuously rotated during the reaction period. At the end of the reaction period, the bomb was cooled to room temperature, the HCl was bled off, and the reaction product was fractionally distilled to remove all of the products boiling below 75° C. to give the silanes listed in the table. All percentages in Table III are expressed as per cent by weight based on the total weight of reaction product.

TABLE III

| Run | Weight Residue, g. | Weight HCl., g. | Temp., °C. | Pressure, p. s. i. | Time, Hours | Wt. Reaction Product in g. | Percent SiCl₄ | Percent MeHSiCl₂ | Percent Me₂SiCl₂ | Percent MeSiCl₃ |
|---|---|---|---|---|---|---|---|---|---|---|
| 1 | 600 | 97 | 342-354 | 1,350-1,390 | 16 | 620 | 5.5 | 1.8 | 11.3 | 43.4 |
| 2 | 600 | 97 | 390-400 | 1,600-1,640 | 16 | 610 | 11.8 | 1.8 | 11.3 | 38.7 |
| 3 | 600 | 132 | 295-310 | 1,350-1,575 | 16 | 550 | 5.9 | 2.0 | 7.3 | 35.5 |
| 4 | 600 | 97 | 395-409 | 1,425 | 2 | 605 | 9.5 | 0.9 | 4.2 | 31 |

That which is claimed is:

1. A method of preparing methylchlorosilanes which comprises heating the residue boiling above dimethyldichlorosilane, which residue was formed during the reaction of methylchloride with silicon, and HCl at a temperature of from 200° C. to 900° C., the HCl being present in amount of at least 4 per cent by weight based on the weight of the residue.

2. A method of preparing methylchlorosilanes which comprises reacting a mixture of the residue boiling above dimethyldichlorosilane, which residue was formed during the reaction of methylchloride and silicon, and HCl at atmospheric pressure at a temperature of from 400° C. to 900° C., the HCl being present in amount of at least 4 per cent by weight based on the weight of the residue.

3. A method of preparing methylchlorosilanes which comprises reacting the residue boiling above dimethyldichlorosilane, which residue was formed during the reaction of methylchloride with silicon, and HCl at superatmospheric pressure at a temperature from 200° C. to 500° C., the HCl being present in amount of at least 4 per cent by weight based on the weight of the residue.

References Cited in the file of this patent

UNITED STATES PATENTS

| Number | Name | Date |
|---|---|---|
| 2,598,435 | Mohler | May 27, 1952 |
| 2,628,243 | Barry | Feb. 10, 1953 |

FOREIGN PATENTS

| Number | Country | Date |
|---|---|---|
| 666,512 | Great Britain | Feb. 13, 1952 |